Patented Mar. 12, 1935

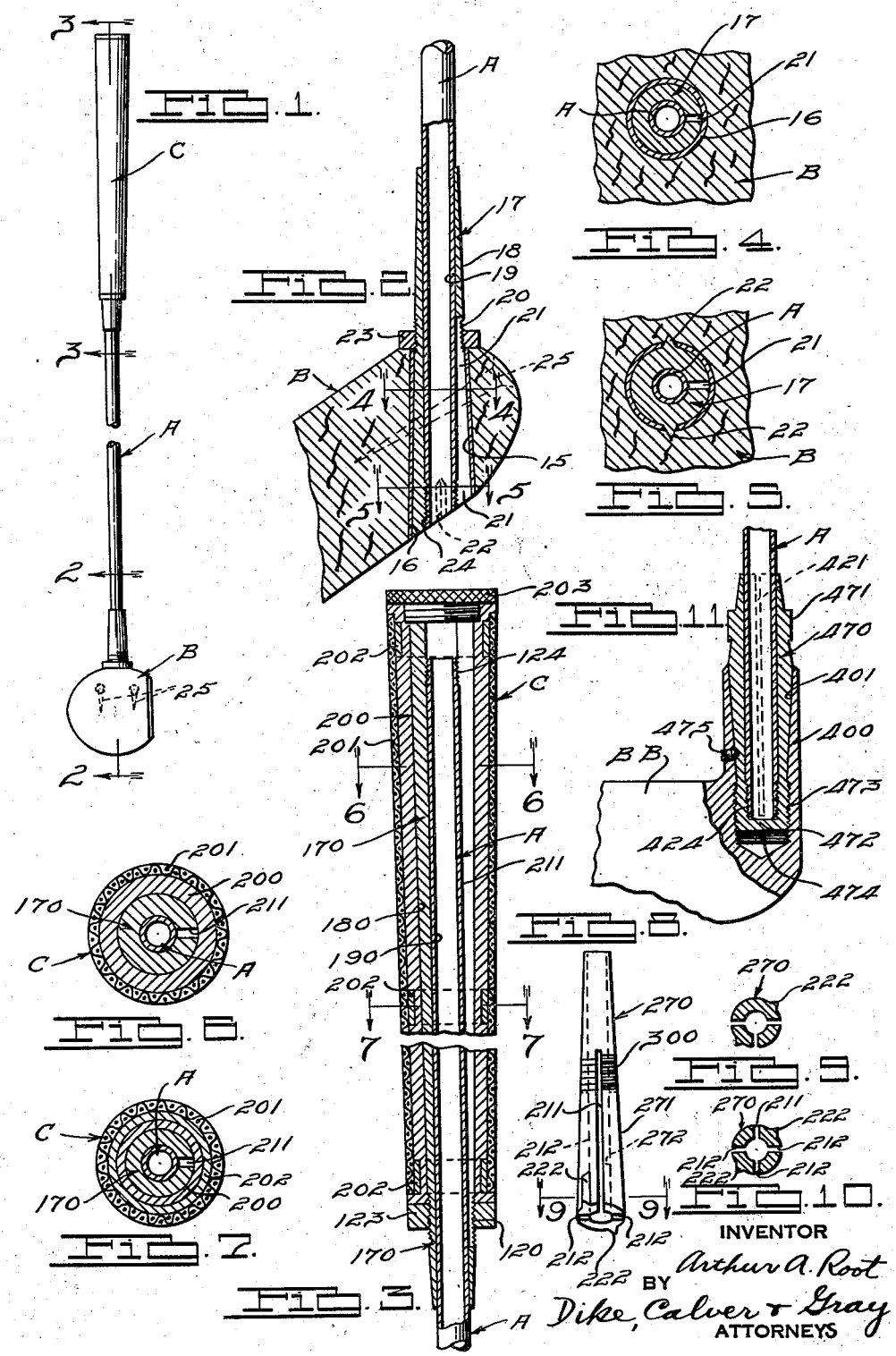
March 12, 1935. A. A. ROOT 1,994,149
GOLF CLUB
Filed June 15, 1932

1,994,149

UNITED STATES PATENT OFFICE 1,994,149

GOLF CLUB

Arthur A. Root, Detroit, Mich.

Application June 15, 1932, Serial No. 617,411

3 Claims. (Cl. 273—80)

My invention relates to golf clubs having wood or steel shafts and wood, composition or metal heads, and more particularly to means for connecting the head to the shaft and the handle or grip portion to the shaft.

An object of my invention is to provide simple and inexpensive means permitting the attachment of a shaft having cylindrical end portions to a previously drilled head to produce a tight joint between the head and shaft without reducing the flexibility of the club at the critical points. Another object of the invention is to permit the attachment of a standard head having a tapered or cylindrical socket or hosel to a shaft having cylindrical end portions. A further object is to provide attaching means which is equally applicable for attaching the usual handle portion or grip to the shaft to permit it to be adjusted on the shaft to adapt the club for players of different statures.

An important feature of my invention is to provide attaching means which adapts itself to shafts, heads and handle portions of standard makes irrespective of whether the head socket or hosel is tapered or cylindrical and whether the shaft is tapered or cylindrical at its end portions.

Other objects of the invention will appear from the following description and appended claims when considered in connection with the accompanying drawing forming a part of this specification.

In said drawing:

Fig. 1 is an elevational view of a golf club embodying my invention.

Fig. 2 is a section taken substantially along the line 2—2 of Fig. 1.

Fig. 3 is a section taken substantially along the line 3—3 of Fig. 1.

Fig. 4 is a section taken along the line 4—4 of Fig. 2.

Fig. 5 is a section taken substantially along line 5—5 of Fig. 2.

Fig. 6 is a section taken substantially along the line 6—6 of Fig. 3.

Fig. 7 is a section along the line 7—7 of Fig. 3.

Fig. 8 is a perspective view of a modified form of the invention.

Fig. 9 is a section taken substantially along the line 9—9 of Fig. 8.

Fig. 10 is a section through a further modification of the invention.

Fig. 11 is a fragmentary vertical section showing a further modification of my invention applied to an iron club head.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawing, A designates as a whole the shaft, which in Fig. 1, for purposes of illustration only, is cylindrical at its opposite ends and which has a downward taper in the section between the handle or grip C and the head or driving portion B.

In accordance with the present disclosure, the head B (Figs. 1 and 2) has been drilled to provide a tapered bore or socket portion 15 within which is fitted a bushing or gasket 16 of any desired material, such for example as fibre, fabric, or the like. The head attaching means of my invention, i. e. the means for mounting the head on the end of the shaft A comprises, preferably, in the case of either a metal shaft and head or a wood shaft and wood or composition head, a relatively light contractible and expansible sleeve shown as a whole at 17 which may be made of any light weight springy non-ferrous metal, such for example as duraluminum, aluminum or galvanized iron. In certain cases, it may be desirable to employ a sleeve made of wood, fibre or some other non-metallic material especially in cases where a wood head and shaft are used. In Figs. 2, 4 and 5, this sleeve has an external taper 18 and an internal cylindrical wall 19. The sleeve is provided with an external threaded portion 20 located preferably, at a point substantially midway between the ends of the sleeve, although the threads may be placed at any desired point on the sleeve. As shown, the sleeve is split longitudinally at 21, from the lower or inner end of the sleeve to a point approximating the upper ends of the threads 20. The slit permits the sleeve to expand or contract the desired amount to adapt it to the shape of the shaft and socket to make a tight fit or joint between the parts. The sleeve is provided adjacent its lower or inner end with lugs or projections 22, two such being shown. The purpose of these lugs is to prevent any tendency of the sleeve to rotate or move relative to the head socket and are of such a character that they will embed themselves in the material of the head when the parts are assembled.

These lugs are not essential to the desired tight fit of the parts but assist to maintain the parts against relative movement, especially when a wooden or composition head is used. A nut 23 is slipped in place over the sleeve and is engaged with the external threads 20. When the nut is turned in one direction, the sleeve is contracted to cause it to grip the shaft end tightly and make a tight fit between the parts.

The lower end of the shaft may be externally threaded at 24. These threads tend to bite into the material of the sleeve 17 and assist in locking the parts together. The threads facilitate the assembling or disassembling of the parts. The parts just described may be assembled in any suitable and convenient manner, one method being to slip the sleeve 17 over the end of the shaft A, the sleeve carrying the adjusting nut 23, and after the bushing or gasket 16 has been inserted in the bore or socket 15 of the head, the assembled sleeve and shaft are inserted in the socket, whereupon the nut 23 is rotated to contract the split sleeve and cause it to engage tightly the end of the shaft. The socket formed in the head in the present embodiment is tapered toward the base or bottom of the head, and since the sleeve 17 has a corresponding taper, it will be understood that when the parts are assembled they fit snugly. In the case of a wooden club it is sometimes desirable to reinforce the structure by applying wood screws thereto, these screws being shown at 25. The heads of the screws are preferably countersunk in the material of the head. This construction permits the attachment of a head having a tapered bore to a shaft in which the end portion thereof is cylindrical and permits tightening of the parts when necessary or desirable, and also permits removal of the head from the shaft when and if it is desirable to replace any of the parts.

Referring particularly to Figs. 3, 6 and 7, an arrangement similar to that shown in the preceding figures is employed for attaching the handle or grip portion of the club to the upper end of the shaft, which upper end is also cylindrical. In the embodiment shown in these figures, the shaft is indicated at A and the handle or grip portion at C. A sleeve 170 corresponding to the sleeve 17 is provided with an externally tapered wall 180 and with an internal cylindrical wall 190 so as to present a relatively close fit between the handle 200 and the shaft A. The handle is provided, preferably, with a grip portion 201 and may be reinforced at spaced points by metallic bands 202, three such bands being shown. The end of the handle may be closed in any suitable manner, as by means of a threaded cap 203. The shaft A is externally threaded at its upper end as shown at 124. The threads tend to embed themselves in the sleeve 170 when the parts are assembled. To permit the sleeve to be contracted or expanded, it is provided with a longitudinal slit 211 which extends from a point adjacent the inner end of the external threads 120 to the outer end of the shaft. The threads 120 are adapted to be engaged by an adjusting nut 123. When the parts are assembled as shown in Fig. 3 the nut 123 is rotated to contract the split portion of the sleeve and cause it to engage the shaft end tightly and effect a tight fit between the parts. The external taper 180 of the sleeve which corresponds with the internal taper of the handle member 200, provides a tight fit between these parts. When it is desirable to adjust the handle or grip C upon the shaft A to adapt the club for use by players of different heights, the nut 123 is rotated to allow the sleeve to expand and release the pressure of the sleeve on the shaft, whereupon the whole handle grip structure may be moved relatively to the shaft. The nut is now turned in the opposite direction to contract the sleeve and lock the parts together in their adjusted position.

Referring now to Figs. 8, 9 and 10 I have shown several modifications of the split sleeve construction shown at 17 and 170 in the preceding views. In these figures, the sleeve is shown as a whole at 270 and is provided with external threads 300. The sleeve has an externally tapered surface 271 and an internal reverse taper 272 to adapt it for use in connection with standard shafts having tapered extremities. The sleeve is provided with a pair of preferably diametrically opposed slots or split portions 212 which extend from the base of the sleeve to a point adjacent the lower end of the threads 300. This type of sleeve is shown in Figs. 8 and 9 and has external lugs or projections 222 similar to the lugs 22 of the preceding views. In Fig. 10 I have shown a cross section of a slightly modified form of sleeve. In this form there is provided a slot 211 corresponding to the slot of Figs. 8 and 9 and three shorter split portions or slots which correspond to the slots 212 of those figures. The purpose of the additional slots is to provide the sleeve with a greater range of contractibility and expansibility when the necessity arises.

In Fig. 11 I have shown a further modification of my invention applied to an iron head BB. This head is provided with an internal socket portion or hosel 400 which has an internal taper 401. In this form of the invention, I have provided a different form of contractible sleeve member shown as a whole at 470. It will be noted that the sleeve has an external taper at its lower portion which corresponds to the socket taper 401. The sleeve 470 has a reverse external taper in its upper portion which extends to the upper end thereof. The purpose of this taper is to present a neat appearance and reduce the weight of the sleeve. The sleeve has a squared or hexagonal portion 471 which provides means to receive a wrench for turning the sleeve when desired. It will be noted that the lower end of the sleeve is closed at 472 and is externally threaded at 473. The sleeve is also split at 421 from its upper or outer end to a point terminating short of its closed end 472. This split portion permits the sleeve to be contracted or expanded when it is threaded into the hosel by means of the application of a tool to the nut portion 471. In assembling the parts, the cylindrical end portion of the shaft A which is externally threaded at 424, is inserted into the sleeve and these assembled parts are then positioned within the socket 400. When the sleeve is rotated, the threads 473 thereof engage threads 474 formed in the socket, and by reason of the contractibility of the sleeve, as it is moved into the socket portion, it will be understood that the sleeve grips the end of the shaft and provides a tight joint or fit between the parts. If desired, a locking screw 475 may be employed to assist in locking the parts together. The screw is threaded through the socket 400 and engages in the wall of the sleeve 470. In the event that the attaching device, made in accordance with this form of the invention, is to be used with a club shaft having a tapered end portion, a sleeve similar to the sleeve 470, but having an internal taper, may be used.

If desirable, I may eliminate the socket portion or hosel 400 shown in Fig. 11. In lieu thereof, the socket portion or internally threaded bore in the iron head BB may be deepened, in which case the split sleeve 470 would not only serve as means for connecting the head and shaft, but the portion of the sleeve which extends above the upper face or edge of the head would provide, in effect, a socket or hosel which is removable with the shaft and which provides the necessary resilient or flexible supporting and attaching means.

It is entirely within the scope of my invention to provide, in addition to the split sleeve described above and shown in the accompanying drawing, a non-metallic resilient and compressible sleeve or member which could be interposed between the club shaft and the split sleeve to give to the club an additional cushioning effect or flexibility.

While I have referred to my invention as used in connection with golf clubs, it is to be understood that the invention can be used with various other kinds of game clubs, such, for example as croquet mallets, polo sticks, etc.

I claim:

1. A golf club comprising a shaft, a head having a tapered bore, a split sleeve having an external taper corresponding to the bore of said head and projecting above the upper face of the head to provide a socket portion or hosel for supporting said shaft, said sleeve having a bore to receive said shaft, means on said sleeve to prevent rotation thereof in said head bore, and means on said sleeve for adjusting the same to effect a tight fit between the several parts.

2. A game club having a shaft member, an end member apertured to receive an end of the shaft member, a split sleeve interposed between said members, said sleeve having a tapered face engaging a tapered face of one of said members, and means including a wrench receiving portion for relatively shifting the sleeve and a member in a longitudinal direction to expand or contract the sleeve by coaction of said tapered faces, thereby clamping said members together.

3. In a golf club, the combination of a shaft, a head having a socket to receive the end of the shaft, an expansible and contractible split sleeve mounted on the shaft and interposed in the socket between the shaft and head, and means for frictionally clamping said sleeve simultaneously to the shaft and head.

ARTHUR A. ROOT.